US008126578B2

(12) United States Patent
Atlas et al.

(10) Patent No.: US 8,126,578 B2
(45) Date of Patent: Feb. 28, 2012

(54) CLIPPED-WAVEFORM REPAIR IN ACOUSTIC SIGNALS USING GENERALIZED LINEAR PREDICTION

(75) Inventors: Les Atlas, Seattle, WA (US); Charles Pascal Clark, Sammamish, WA (US)

(73) Assignee: University of Washington, Seattle, WA (US)

( * ) Notice: Subject to any disclaimer, the term of this patent is extended or adjusted under 35 U.S.C. 154(b) by 1189 days.

(21) Appl. No.: 11/862,068

(22) Filed: Sep. 26, 2007

(65) Prior Publication Data

US 2009/0083031 A1 Mar. 26, 2009

(51) Int. Cl.
*G06F 17/00* (2006.01)

(52) U.S. Cl. ........................... 700/94; 704/219; 704/265

(58) Field of Classification Search .................... 700/94; 704/219, 265

See application file for complete search history.

(56) References Cited

U.S. PATENT DOCUMENTS

| | | | | |
|---|---|---|---|---|
| 5,025,404 | A | 6/1991 | Janssen et al. | 708/290 |
| 5,331,587 | A | 7/1994 | Abel et al. | 708/819 |
| 7,003,448 | B1 | 2/2006 | Lauber et al. | 704/200.1 |
| 7,809,556 | B2 | 10/2010 | Goto et al. | 704/219 |
| 2002/0176353 | A1 | 11/2002 | Atlas et al. | 370/203 |
| 2004/0186707 | A1 | 9/2004 | Fourquin et al. | 704/205 |
| 2004/0220799 | A1 | 11/2004 | Peeters et al. | 704/205 |
| 2007/0100610 | A1 | 5/2007 | Disch et al. | 204/212 |
| 2008/0040122 | A1 | 2/2008 | Chen et al. | 704/501 |
| 2008/0046233 | A1 | 2/2008 | Chen et al. | 704/211 |
| 2008/0056511 | A1 | 3/2008 | Zhang et al. | 381/94.4 |
| 2008/0253553 | A1 | 10/2008 | Li et al. | 379/406.05 |

OTHER PUBLICATIONS

Abel, Jonathan S., and Julius O. Smith, III. "Restoring a Clipped Signal" pp. 1745-1748. Tetra Systems Incorporated, Palo Alto, CA. and CCRMA, Department of Music, Standord, CA. © IEEE 1991.

Fong, William, and Simon Godsill. "Monte Carlo Smoothing for Non-Linearly Distorted Signals" Signal Processing Group, University of Cambridge, Cambridge, CB2 1PZ, U.K. pp. 3997-4000. © IEEE 2001.

Janssen, A.J.E.M., Raymond N.J. Veldhuis, and Lodewijk B. Vries. "Adaptive Interpolation of Discrete-Time Signals That Can Be Modeled as Autoregressive Processes" IEEE Transactions on Acoustics, Speech, and Signal Processing. vol. ASSP-34, No. 2. pp. 317-330. Apr. 1986.

(Continued)

*Primary Examiner* — Walter F Briney, III

(74) *Attorney, Agent, or Firm* — Kilpatrick Townsend & Stockton LLP

(57) ABSTRACT

A method and system for optimally repairing a clipped audio signal. Clipping occurs when a waveform exceeds a dynamic range of a recording device. Portions of an audio signal exceeding the dynamic range or saturation level of the recording device are clipped, causing distortion when the clipped recorded signal is played. To address this problem, successive frames of the clipped audio data are repaired to fill in gaps where the data were clipped. For each frame, an iterative process repetitively estimates an auto-covariance and detects clipped samples in the frame or a sub-frame in order to compute a least-squares solution for the frame that interpolates the clipped data. The process can cause inverted peaks in the repaired data, which must then be rectified to produced corrected repaired data. The corrected repaired data for the successive frames are recombined using interpolation, to produce a complete repaired audio data set.

20 Claims, 3 Drawing Sheets

OTHER PUBLICATIONS

Olofsson, Tomas. “Deconvolution and Model-Based Restoration of Clipped Ultrasonic Signals” IEEE Transactions on Instrumentation and Measurement, vol. 54, No. 3. pp. 1235-1240. Jun. 2005.

Veldhuis, R.N.J., A.J.E.M. Janssen, and L.B. Vries. “Adaptive Restoration of Unknown Samples in Certain Time-Discrete Signals” Philips Research Laboratories and Philips Audio Department, Eindhoven, The Netherlands. pp. 1013-1016. © IEEE 1985.

Kauppinen et al.., “Reconstruction Method for Missing or Damaged Long Portions in Audio Signal.” *J. Audio Eng. Soc.*, vol. 50, No. 718: 594-602, 2002.

Loughlin et al., “Bilinear Time-Frequency Representations: New Insights and Properties.” *IEEE Transactions on Signal Processing*, vol. 41, No. 2: 750-767, 1993.

Thompson et al., “A Non-Uniform Modulation Transform for Audio Coding with Increased Time Resolution.” *ICASSP*: 397-400, 2003.

CLIPPED-WAVEFORM REPAIR IN ACOUSTIC SIGNALS USING GENERALIZED LINEAR PREDICTION

BACKGROUND

An input circuit in an electronic device will typically be designed to accept an input signal in a predefined amplitude range. If the input signal exceeds the maximum design amplitude, the signal cannot be properly processed. This problem is very common in devices such as audio recorders, which include an input preamplifier to process the signal from a microphone. While it may be possible to selectively use an automatic gain control circuit upstream of the input preamplifier to attenuate input signals that exceed the maximum rated amplitude, a user may choose not to employ such a circuit to avoid limiting the dynamic range of the recorded signal. The user may prefer to control the input level by adjusting a manual gain or manual attenuation control that limits the amplitude of the input signal being recorded. Also, some recording devices do not include an automatic gain control.

It can be difficult to predict the maximum amplitude signal that will be produced during a recording session in order to properly set the input control of a recording device before a session is recorded. If the maximum rated input signal amplitude is exceeded, saturation of the input circuitry occurs and the recording that results will exhibit "clipping." When a recorded signal is clipped, the peak levels of the recorded signal that were in excess of the rated maximum will not be accurately recorded. Instead, the recorded waveform will appear flat where the input signal exceeds the maximum rated amplitude level. When the recorded clipped audio signal is played back to a user, it will sound distorted. These clipped portions of the signal are analogous to short gaps in the recorded waveform, since the true amplitude of the waveform is missing in each clipped section.

To avoid clipping the recorded signal, a user can appropriately adjust the input signal amplitude, for example, while viewing the input level on a sound level meter, so that the sound level of the input signal applied to the input circuitry of the device does not exceed the rated amplitude. For making a recording of sound that is relatively constant in amplitude, the adjustment of the sound level for the input signal is relatively easy. However, in recording dynamically varying sound levels, it can be difficult or virtually impossible to predict the maximum amplitude that may be input, and clipping can occur before a user can respond to an increasing input signal level by adjusting the input control to reduce the signal below the clipping level. In addition, adjustment of the input control while a signal is being recorded can also adversely impact the dynamic range accuracy with which the input signal is recorded, since the input signal will be recorded at different input attenuation settings. Once an audio event has been recorded with clipping, it may not be possible to repeat the recording with the input control set properly to avoid clipping.

Accordingly, it would be desirable to repair a clipped signal to effectively restore the full dynamic range of the original input signal and minimize distortion that has resulted because of saturation of an input circuit and clipping of the audio signal that was recorded. Various approaches have been developed for accomplishing this task, but they typically do not produce a sound with the desired quality or may require too much processing to be carried out in a consumer application. Accordingly, a more effective and efficient approach for repairing a clipped waveform of a recorded audio signal is needed.

SUMMARY

The discussion set forth above is directed to repairing audio data that have been clipped due to the dynamic range of an input signal exceeding the capabilities of an input circuit in a recording device. However, this problem with clipping of data can arise in many other applications and is not limited simply to audio recordings. Accordingly, an exemplary method is discussed below that is generally useful for repairing almost any type of data in which clipping has occurred. The goal of this method is to restore data that were lost due to the clipping. In this approach, the clipped audio data are processed in terms of relatively short frames. For example, each frame of data that is processed might be from 30-50 milliseconds in duration. For each frame of the data, the method includes a plurality of steps that are iteratively carried out. In one of these steps, an auto-covariance for the data in the frame is estimated and is used for determining a least-squares solution for the frame of data that was clipped. Based upon the least-squares solution, the method produces restored data in which the clipped data are estimated by interpolation from samples of the data in the frame that were not clipped. Next, for all but a last iteration, peak rectification is applied to correct inversion errors in the restored data. The result produces current repaired data for the frame. These steps are then repeated in the next iteration, but using the current repaired data that were just produced. The last iteration produces the final repaired data for the frame. The next frame of clipped data is then processed in the same iterative manner, until the successive frames of the data in which clipping has occurred have been repaired.

For most applications of this method, successive frames of the data overlap. However, for certain types of data, it may not be necessary to employ overlapping frames. If overlapping frames are not used, the method may include the step of adjusting a duration of the successive frames of data that do not overlap, so that a boundary between the successive frames does not coincide with a clipped portion of the data. This step may be necessary to avoid interpolation discontinuities at the boundary of a frame.

The method may also include the step of automatically detecting clipped samples in the data. To automatically detect the clipped samples, a vector of the data containing clipped samples is identified, based upon a set of indices at which the vector either exceeds a defined maximum value or is less than a defined minimum value.

The step of estimating the covariance can include the step of determining a sample mean for a vector of samples of data that are clipped in the frame. An estimate of the covariance is then determined, based upon the sample mean and the vector of the samples. Iteration tends to reduce an error in the step of estimating the covariance.

The method may further include the step of using interpolation for recombining the successive frames of final repaired data to produce a complete set of repaired data. If the data that are clipped comprise audio data, the complete set of the repaired data will then comprise repaired audio data. Further, the method can then include at least one step selected from a group of steps. Specifically, the group of steps includes the step of storing at least a portion of the complete set of the repaired audio data, enabling a person to listen to at least a portion of the complete set of the repaired audio data, and recording at least a portion of the complete set of the repaired audio data on a medium.

Another aspect of this technology is directed to a memory medium on which are stored machine executable and readable instructions, for carrying out the steps of the method. Yet another aspect of the technology is directed to an exemplary system for repairing data in which clipping has occurred, to restore data that were lost due to the clipping. The system includes a memory in which machine instructions are stored, and a processor that is coupled to the memory. The processor executes the machine instructions, which cause the processor to carry out a plurality of functions that are generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1A:
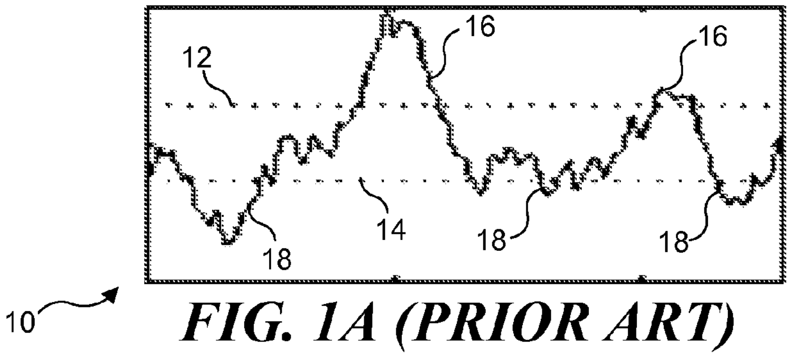
FIG. 1A (PRIOR ART)
FIG. 1A (Prior Art) illustrates an exemplary input signal with a dynamic range that exceeds the saturation levels of an input circuit of a device.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Example of Clipping

Figure 1B:
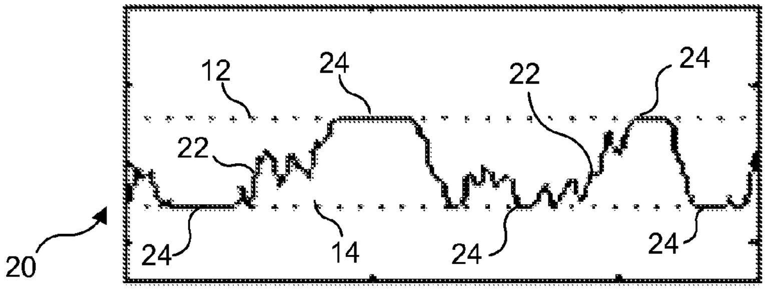
FIG. 1B (PRIOR ART)
FIG. 1B (Prior Art) illustrates the distorted clipped signal that is produced as a result of the input signal of FIG. 1A being applied to the input circuit.

FIG. 1A (which can be considered as part of the prior art) illustrates an input signal 10 having a dynamic range sufficiently great so that its amplitude exceeds a positive saturation level 12 and a negative saturation level 14. Specifically, it will be evident that positive peaks 16 are above positive saturation level 12, while negative peaks 18 are below negative saturation level 14. Because the input circuitry that must process input signal 10 does not have a dynamic range sufficiently great to handle the input signal, FIG. 1B illustrates a recorded signal 20 that is clipped and will sound distorted if heard by a listener. Recorded signal 20 includes samples 22 of the waveform that are not distorted because the amplitude of samples 22 lie between positive saturation level 12 and negative saturation level 14. However, clipped portions 24 of the recorded waveform have a substantially flat amplitude at the positive and negative saturation levels, where the input signal saturated the input circuitry. Clipped portions 24 in the recorded signal thus represent gaps in the audio data that the present approach attempts to repair by restoring an approximation of the input signal that is missing in the clipped portions.

Although the following discussion is directed to repairing clipped audio data, it will be understood that the same approach can be applied to repair almost any type of signal that has been clipped as a result of a dynamic range of an original input signal exceeding the saturation levels of an electronic circuit that processes the input signal. Accordingly, it will be understood that this novel approach is not intended to in any way be limited to repairing clipped audio data, but can be applied to other types of clipped data, either as recorded or in real time.

Exemplary Clipping Repair Procedure

Figure 2:
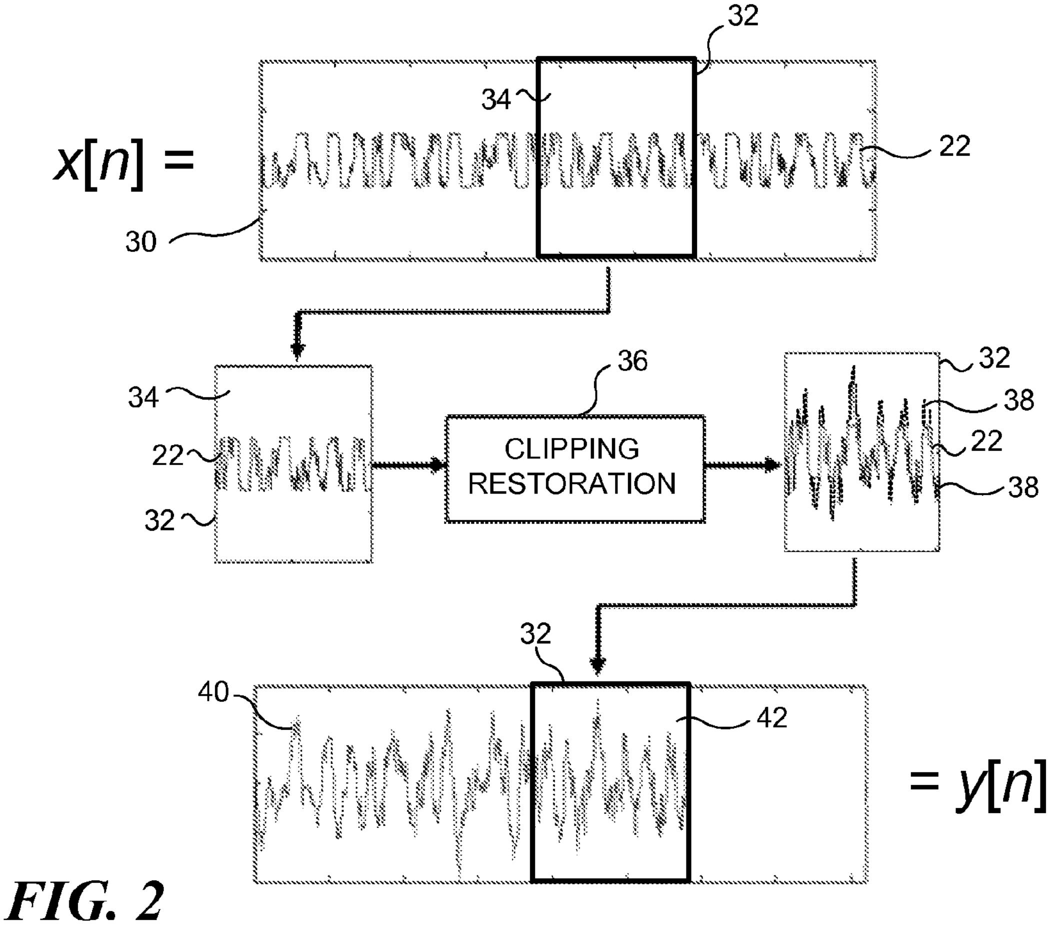
FIG. 2 is an exemplary system flow diagram for the clipping restoration procedure, wherein each window from the input x[n] is individually interpolated and then added to the output, y[n]

The overall clipping repair process can be broadly described as a windowing operation where the frames are restored individually and then recombined to synthesize the output. This process is illustrated in FIG. 2, where x[n] is a clipped signal 30 and y[n] is a repaired output signal 40. In the discussion below, details of a “Clipping Restoration” block 36, which represents the steps of a novel procedure used to repair clipping in successive frames 32 of the audio data are described. Essentially, the present approach approximates the audio data that were lost as a result of clipping in each of a plurality of successive frames 32, by interpolating audio data 34 in the frame to fill in the gaps caused by clipping. When a frame is thus repaired, restored peaks 38 are added to samples 22 of the audio data that were within the saturation limits of the input circuitry, to recover a repaired audio waveform 42 in the frame that is a close approximation of the original full dynamic range input signal. The successive frames of audio data that are thus repaired are then recombined to produce repaired output signal 40.

Clipped Sample Selection for One Frame

Figure 3:
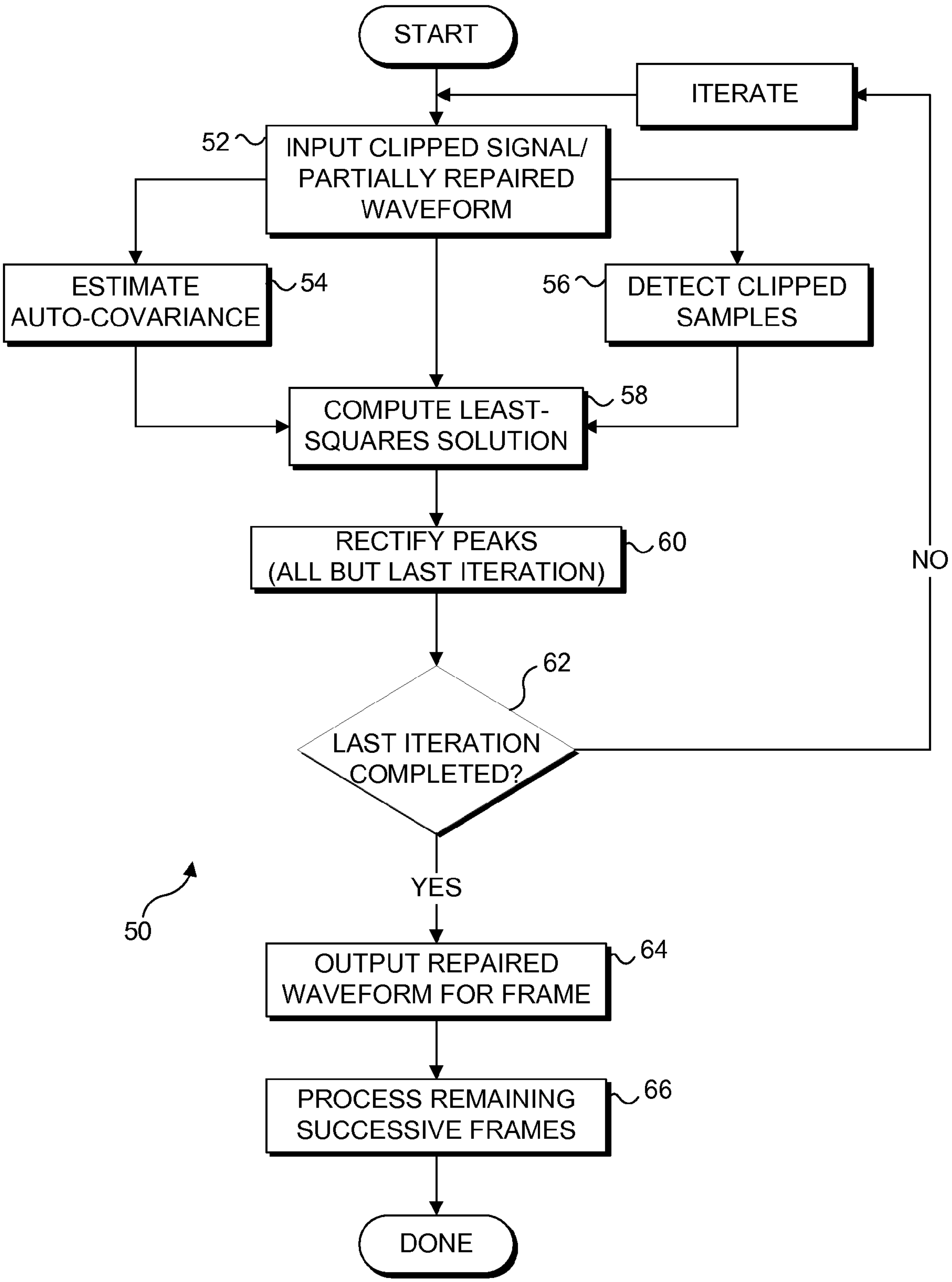
FIG. 3 is an exemplary system flow diagram for the iterative clipping restoration process, for one frame of audio data.

FIG. 3 illustrates exemplary logical steps 50 of a flowchart for repairing clipped audio data in a frame using an iterative process. Upon starting the process, a step 52 provides for input of a clipped signal, or on subsequent iterations, input of a “partially repaired waveform.” As used herein, the term “partially repaired waveform” is intended to mean that one or more iterations of the repair process have been carried out to approximate the missing audio data needed to fill in the gaps where clipping has occurred. With each iteration, the accuracy of the restored data in each clipped portion of a frame improves, until after the last iteration, it is accurate within an acceptable error limit.

A step 54 then provides for estimating an auto-covariance for the audio data in the frame currently being processed. Further details of step 54 are discussed below.

In addition, a step 56 provides for detecting clipped samples in the current frame. The detection of clipped samples in a frame of audio data is a straightforward process. If X is a vector of data containing clipped samples, then the set of indices at which X has clipped samples is defined as:

$$C=\{i: 0\leqq i<N \text{ and } (X_i>\mu^+ \text{ or } X_i<\mu^-)\} \quad (1)$$

where $$\mu^+=(1-\epsilon)\max\{X\}$$

$$\mu^-=(1-\epsilon)\min\{X\} \quad (2)$$

for some tolerance $\epsilon$. A good choice for $\epsilon$ is a small fraction such as 0.01, which permits some leeway in identifying the corners of clipped segments. In practice, a simple element-wise search of X determines the elements of C.

Clipping Restoration for One Frame—Theory

The primary assumption of the clipping repair algorithm is that every clipped sample can be approximated by a linear combination of known samples. Let X be the N-length signal of clipped audio data. Further, denote C as the ordered set of indices for which X is unknown (i.e., clipped samples), and Ω as the set of known or "observed" samples. That is, $$C\cup\Omega=\{0, 1, \ldots, N-1\},\ C\cap\Omega=\emptyset,$$

where C is defined above. In the remainder of this section, C(i) will refer to the ith element of the ordered set C, and likewise for Ω(i).

By the assumption of linear prediction, $$X_i = \sum_j h_{i,j}X_j + e_i \quad i \in C,\ j \in \Omega \quad (3)$$

where $h_{i,j}$ are coefficients to be determined and e is an error vector. If there are M known samples and L unknown samples in X, then the h coefficients can be grouped compactly as an L×M matrix H.

Along the lines of a Wiener filter, the optimal H is defined as the matrix that minimizes the expected value of the squared norm of the error term in (3). This condition is obtained by solving Eq. (3) for the vector e, taking the expected value of its squared norm, differentiating with respect to the elements $h_{ij}$, and setting the derivative to zero. This problem is a standard quadratic optimization problem, which is discussed by Raymond Veldhuis, in his work entitled, "Restoration of Lost Samples in Digital Signals," Prentice Hall International (1990) and has a unique minimum given by:

$$\sum_{j=0}^{M-1} h_{i,j}R_{k-\Omega(j)} - R_{C(i)-k} = 0, \quad (4)$$

$$k \in \Omega,\ i = \{0, \ldots, L-1\}$$

where $R_\tau$ is the auto-covariance sequence of X, assuming X is a finite realization from some stationary random process. The above expression can be converted to matrix notation and solved via:

$$HR'=\hat{R}\rightarrow H=\hat{R}(R')^{-1} \quad (5)$$

where $$R'_{p,q}=R_{\Omega(p)-\Omega(q)},$$

$$\hat{R}_{s,t}=R_{C(s)-\Omega(t)}, \quad (6)$$

In words, R' is formed by taking the Toeplitz matrix $R_{n,m}=R_{n-m}$ and then deleting the rows and columns corresponding to unknown samples. Similarly, $\hat{R}$ is formed from $R_{n,m}$ by deleting the rows corresponding to known samples and the columns corresponding to unknown samples. Then, Eq. (5) is solved directly using matrix inversion.

A step 58 in FIG. 3 then provides for computing the least-squares solution for the clipped samples of the audio data in the frame, as a function of the auto-covariance. In this step, the exemplary procedure defines an M-length vector X' as containing only the unclipped samples of X. Then the least-squares solution to the clipped-sample estimation problem is given by an L-length vector:

$$\hat{X}=HX'. \quad (7)$$

The restored signal is then:

$$Y_n = \begin{cases} X_n, & n \in \Omega \\ \hat{X}_{C^{-1}(n)}, & n \in C \end{cases} \quad (8)$$

Implementation—Auto-Covariance Estimation and Iteration

In practice, the chief difficulty in determining the least-squares solution is that the true auto-covariance sequence $R_\tau$ of X is unknown. For a finite X, $R_\tau$ is commonly approximated by the biased estimator:

$$\tilde{R}_\tau = \frac{1}{N}\sum_{n=0}^{N-1-|\tau|}(X_n-\overline{X})(X_{n+\tau}-\overline{X}), \quad (9)$$

where $\overline{X}$ is the sample mean. In this application, however, X contains clipped samples that affect the estimation of $\tilde{R}_\tau$. To compensate for a flawed auto-covariance estimate, the proposed clipping restoration algorithm solves Eq. (5) multiple times for each frame by employing multiple iterations, each iteration using a new auto-covariance estimate derived from the output of the previous iteration. Experiments have shown that this method typically converges to a result with an acceptable error in usually less than ten iterations.

Implementation—Peak Rectification

Another modification to the optimal interpolation scheme is peak rectification, which is carried out in a step 60 in FIG. 3. Step 60 forces clipped samples to exist either above $\mu^+$ or below $\mu^-$. Yet, as a result of the imperfect auto-covariance estimate, the interpolator in Eq. (5) sometimes estimates replacement samples that are below $\mu^+$ or above $\mu^-$, which are clearly incorrect. The step of applying a peak rectification attempts to remedy such faulty interpolations, where the rectified signal is formulated as:

$$Y_n^{(P)} = \begin{cases} \mu^+ + |Y_n - \mu^+|, & n \in C,\ 0 < Y < \mu^+ \\ \mu^- - |Y_n - \mu^-|, & n \in C,\ 0 < Y < \mu^- \\ Y_n, & \text{else} \end{cases} \quad (10)$$

However, care must be taken to not rectify peaks in the final iteration of the clipping restoration procedure, because doing so may leave the output with audible discontinuities in the waveform. Instead, the rectification step helps guide the convergence of the interpolation process in all but the final iteration for each frame.

A decision step 62 then determines if the last iteration has been completed, which can simply be based upon carrying out a predefined number of iterations, or on determining if the last error in the estimate of the auto-covariance is within acceptable limits. If not, the process proceeds with another iteration, returning to step 52. Once the last iteration has been carried out in decision step 62, a step 64 provides for output of the repaired waveform for the current frame. These steps are then repeated for each successive frame of the clipped signal that is to be repaired in a step 66, and the process is done once the complete repaired audio waveform is produced by recombining the repaired audio data of these frames.

Implementation—Faster Solution Using Sub-Frames

The interpolation method outlined by Eqs. (5), (6), and (7) can also apply to sub-frames within a single frame of data, enabling each sub-frame to be interpolated separately, using appropriately truncated versions of the matrices in Eq. (5). Since the computational complexity of matrix inversion is non-linear and polynomial, reducing the matrix size can improve the run-time of the algorithm. Even though interpolation may occur within sub-frames, each sub-frame uses the same auto-covariance estimate obtained from the entire frame of data, because a reliable auto-covariance estimate requires a sufficient number of samples. Once the estimate is found for a frame, however, each sub-frame then only needs a subset of the auto-covariance values corresponding to small lags. The results of sub-frame interpolation tend to be similar to the one-step interpolation method described above, because the covariance between samples generally decreases as the samples become more separated in time.

Summary of the Interpolation Process

The repair of clipped audio data in a frame essentially is an interpolation process. The entire clipping restoration algorithm for a single frame is summarized by the following steps:

1. Determine C as defined by Eqs. (1) and (2).
2. Set $Y^{(0)}=X$.
3. Set q=0.
4. Compute $R_\tau^{(q)}$ via Eq. (9) with $Y^{(q)}$ substituted for X.
5. Carry out Eqs. (5), (6), (7), and (8) using $R_\tau^{(q)}$, obtaining $Y^{(q+1)}$ as a result.
6. If $q<q_{max}$, then rectify the peaks in $Y^{(q+1)}$ according to Eq. (10).
7. If $q<q_{max}$, then increment q, i.e., q=q+1, and repeat steps 4-7.

Data Segmentation via Windowing

Finding an optimal solution for long-duration clipping is possible only for a stationary signal. For natural time-varying signals like music and speech, a windowing scheme subdivides the signal into short intervals over which the signal is locally stationary, which allows the procedure described above to separately restore each frame. The windowing scheme that is used for this exemplary approach is described below. In this discussion, the terms "window" and "frame" are used interchangeably.

Window Length

The window length (i.e., the length of each frame of the audio data that is processed) is a parameter that can be adjusted on a signal-by-signal basis, but in general a window of approximately 30 milliseconds in length is sufficient for most signals. Since the windowed frame will later be subject to an interpolation operation during the repair process (as described above), a rectangular window shape maintains proper relationships between the audio data as successive frames are processed.

Window Overlap

Overlapping windows or frames of audio data essentially average over many interpolation operations. This redundancy appears to have an overall smoothing effect on the relationships between adjacent frames, and thus maintains a sense of homogeneity as the analysis window slides across the clipped signal and repairs it. In practice, window or frame overlap is another parameter that can be adjusted, depending on the nature of the input signal. Some signals require no overlap, yet an overlap of 75% is a safe value that works for most cases.

Since the window shape is rectangular, the amount of overlap between frames is limited to factors of the window length. In other words, the window length N and the overlap P satisfy the relationship:

$$N=k(N-P),\ k=\text{some integer.} \tag{11}$$

Window overlap requires careful synthesis in order to correctly reconstruct the full-length signal when the repaired frames are recombined. Define one frame of data as:

$$x_i[n]=x[n]w[n-iP], \tag{12}$$

where the function w[n] is the rectangular window of length N and amplitude 1. After repairing the clipping in x[n], the restored frames $y_i[n]$ are recombined as:

$$y[n]=\frac{1}{k}\sum_i y_i[n],\ k=\frac{N}{N-P}. \tag{13}$$

Overlapping-window synthesis creates an averaging effect that tends to smooth over interpolation discontinuities at frame boundaries. The redundancy of overlapping frames also enables the elimination of such discontinuities entirely. Eq. 13 effectively expresses every sample of y[n] as an average of samples from k adjacent frames, but can be modified slightly to average only the non-discontinuous interpolated points. In this case, affected samples of y[n] will be averages of less than k terms, rather than k terms.

Special Case—No Window Overlap

As previously mentioned, overlap is not required for all signals. In the interest of saving computation time, some signals can be safely processed without overlap, albeit with a slightly modified windowing scheme. In order to prevent interpolation discontinuities at the window boundaries, the edge of the analysis window must be prevented from coinciding with a clipped sample. An adjustable window length guarantees this condition.

To be explicit, when overlap is not used, the analysis window or frame has a variable length (in contrast to the use of a fixed length window or frame if overlap is used), defined as follows:

$$x_i[n]=x[n]w_i[n-n_0],\ n_0=\sum_{m=0}^{i-1}N_m, \tag{14}$$

where $N_i$ is the length of the ith window $w_i[n]$. The length $N_i$ is determined by first attempting to use a nominal length N, looking for clipped samples at the boundary points of the frame, and then adjusting the length accordingly to avoid a clipped sample coinciding with the boundary of the frame.

When adjusting the window length, there are two cases. In the first case, the final point of the ith frame coincides with a clipped sample. Let $s_k$ and $f_k$ be the starting and ending indices, respectively, of the kth contiguous segment of clipped samples within the scope of the frame, where K is the total number of contiguous clipped regions. The new window length, after adjustment, is then:

$$N_m=\max\left\{\frac{1}{2}(s_K+f_{K-1}),\ s_K-\delta\right\},$$

where δ is a constant value set to the integer nearest N/10. In other words, the new window length is set to the midpoint between the last two contiguous segments of clipped samples, as long as the segments are not too far separated.

In the second case, the first point of the ith frame coincides with a clipped sample. $N_m$ is set to N+1 and the window position shifts backward by one sample. Such a move is valid so long as the first case is handled properly for the previous frame.

Exemplary System for Repairing Clipped Audio Signal

Figure 4:
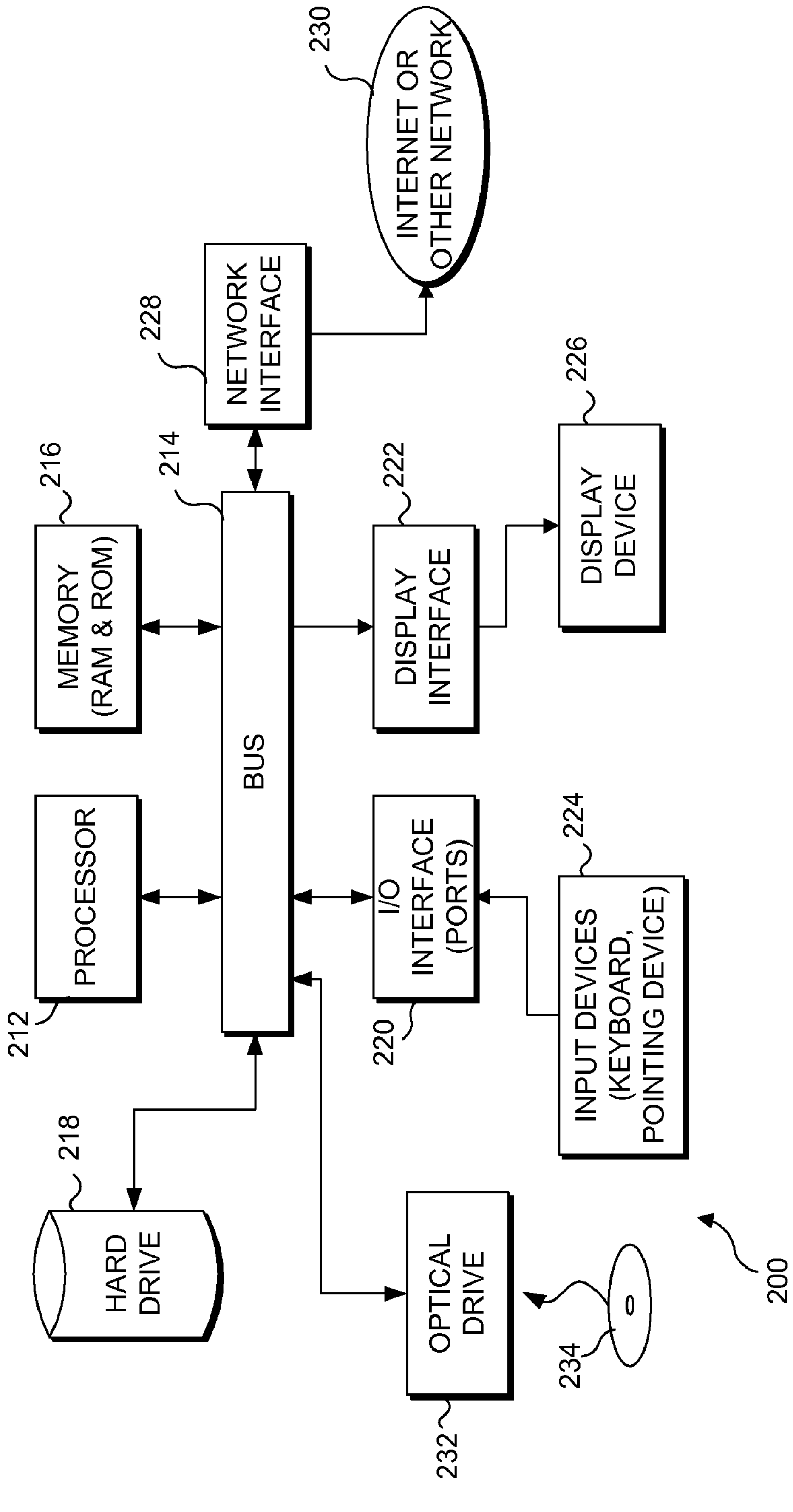
FIG. 4 is a functional block diagram of a computing device (e.g., a personal computer) that is generally usable to carry out the novel approach that is discussed herein.

FIG. 4 illustrates details of a functional block diagram for a computing device 200. The computing device can be a typical personal computer, but can take other forms in which a logic or hardwired device carries out the steps of the procedure. In this exemplary embodiment, a processor 212 is employed for executing machine instructions that are stored in a memory 216. The machine instructions may be transferred to memory 216 from a data store 218 over a generally conventional bus 214, or may be provided on some other form of memory media, such as a digital versatile disk (DVD), a compact disk read only memory (CD-ROM), or other non-volatile memory device. An example of such a memory medium is illustrated by a CD-ROM 234. Processor 212, memory 216, and data store 218, which may be one or more hard drive disks or other non-volatile memory, are all connected in communication with each other via bus 214. The clipped data can be provided as a stored file on data store 218, or can be input from some external device, such as a recording device on which clipped audio data are recorded. The machine instructions in the memory are readable by the processor and executed by it to carry out the functions discussed above in regard to the exemplary embodiments. Also connected to the bus may be a network interface 228, an input/output interface 220 (which may include one or more data ports such as any of a serial port, a universal serial bus (USB) port, a Firewire (IEEE 1394) port, a parallel port, a personal system/2 (PS/2) port, etc.), and a display interface or adaptor 222. The input signal in which one or more gaps has occurred can be provided through the input/output interface. Although not shown in this view, the exemplary system may also include a sound card coupled to one or more speakers or headphones for playing the repaired audio signal.

As noted above, the input signal with one or more gaps caused by clipping may be provided in a form of a stored signal on a memory medium such as a floppy disk, or an optical storage medium, or may have been previously stored on data store 218 after being received over a connection to a network Internet 230, or from some other source, such as a recording device. Any one or more of a number of different input devices 224 such as a keyboard, mouse or other pointing device, trackball, touch screen input, etc., are connected to I/O interface 220. A monitor or other display device 226 is coupled to display interface 222, so that a user can view graphics and text produced by the computing system as a result of executing the machine instructions, both in regard to an operating system and any applications being executed by the computing system, enabling a user to interact with the system. An optical drive 232 is included for reading (and optionally writing to) CD-ROM 234, or some other form of optical memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for repairing data in which clipping has occurred, to restore data that were lost due to the clipping, comprising the steps of:

(a) for each frame of the data in which clipping has occurred, iteratively carrying out the following steps:
 (i) estimating an auto-covariance for the data in the frame;
 (ii) determining a least-squares solution for the frame or a sub-frame of data that was clipped;
 (iii) based upon the least-squares solution, producing restored data in which the clipped data are estimated by interpolation from samples of the data in frames or sub-frames that were not clipped;
 (iv) for all but a last iteration, applying peak rectification to correct errors in the restored data, producing current repaired data for the frame; and
 (v) repeating steps (i)-(iv) using the current repaired data that were just produced, until the last iteration has been completed, the last iteration producing final repaired data for the frame; and
(b) repeating step (a) until successive frames of the data in which clipping has occurred have been repaired.

2. The method of claim 1, wherein successive frames of the data overlap.

3. The method of claim 1, further comprising the step of adjusting a duration of successive frames of data that do not overlap, so that a boundary between successive frames of the data does not coincide with a clipped portion of the data, to avoid interpolation discontinuities at the boundary.

4. The method of claim 1, further comprising the step of automatically detecting clipped samples in the data.

5. The method of claim 4, wherein the step of automatically detecting the clipped samples comprises the step of identifying a vector of the data containing clipped samples, based upon a set of indices at which the vector exceeds a defined maximum value or is less than a defined minimum value.

6. The method of claim 1, wherein for each frame, the step of estimating the covariance comprises the steps of:

(a) determining a sample mean for a vector of samples of data that are clipped in the frame; and
(b) determining an estimate of the covariance based upon the sample mean and the vector of the samples.

7. The method of claim 6, wherein the iteration of the step of estimating the covariance tends to reduce an error in the estimate of the covariance with each iteration.

8. The method of claim 1, further comprising the step of using interpolation for recombining the successive frames of final repaired data to produce a complete set of repaired data.

9. The method of claim 8, wherein the data that are clipped comprise audio data, and wherein the complete set of the repaired data comprises repaired audio data, further comprising at least one step selected from the group of steps consisting of:

(a) storing at least a portion of the complete set of the repaired audio data;
(b) enabling a person to listen to at least a portion of the complete set of the repaired audio data; and
(c) recording at least a portion of the complete set of the repaired audio data on a medium.

10. A memory medium on which are stored machine executable and readable instructions, for carrying out the steps of claim 1.

11. A system for repairing data in which clipping has occurred, to restore data that were lost due to the clipping, comprising:

(a) a memory in which machine instructions are stored;

(b) a processor coupled to the memory, for executing the machine instructions, execution of the machine instructions causing the processor to carry out a plurality of functions, including:

(i) for each frame of the data in which clipping has occurred, iteratively carrying out the following functions:

(A) estimating an auto-covariance for the data in the frame;

(B) determining a least-squares solution for the frame or a sub-frame of data that was clipped;

(C) based upon the least-squares solution, producing restored data in which the clipped data are estimated by interpolation from samples of the data in the frames or sub-frames that were not clipped;

(D) for all but a last iteration, applying peak rectification to correct errors in the restored data, producing current repaired data for the frame; and (E) repeating the functions in subparagraphs (A)-(D) using the current repaired data that were just produced, until the last iteration has been completed, the last iteration producing final repaired data for the frame; and (ii) repeating the function of subparagraph (i) until successive frames of the data in which clipping has occurred have been repaired.

12. The system of claim 11, wherein the machine instructions cause the processor to process successive frames of the data that overlap.

13. The system of claim 11, wherein the machine instructions cause the processor to adjust a duration applied to successive frames of data that do not overlap, so that a boundary between successive frames of the data does not coincide with a clipped portion of the data, to avoid interpolation discontinuities at the boundary.

14. The system of claim 11, wherein the machine instructions cause the processor to automatically detect clipped samples in the data.

15. The system of claim 14, wherein the machine instructions cause the processor to detect the clipped samples by identifying a vector of the data containing clipped samples, based upon a set of indices at which the vector exceeds a defined maximum value or is less than a defined minimum value.

16. The system of claim 11, wherein the machine instructions cause the processor to estimate the covariance for each frame of the data by:

(a) determining a sample mean for a vector of samples of data that are clipped in the frame; and (b) determining an estimate of the covariance based upon the sample mean and the vector of the samples.

17. The system of claim 16, wherein the machine instructions cause the processor to estimate the covariance so as to reduce an error in the estimate of the covariance with each iteration.

18. The system of claim 11, wherein the machine instructions cause the processor to use interpolation to recombine the successive frames of final repaired data to produce a complete set of repaired data.

19. The system of claim 18, wherein the data that were clipped comprise audio data, and the complete set of repaired data comprises a complete set of repaired audio data, and wherein the machine instructions cause the processor to carry out at least one function selected from the group of functions consisting of:

(a) storing at least a portion of the complete set of the repaired audio data in a storage;

(b) enabling a person to listen to at least a portion of the complete set of the repaired audio data with a playback device; and (c) recording at least a portion of the complete set of the repaired audio data on a medium.

20. The system of claim 11, wherein machine instructions cause the processor to process the clipped data in frames that are sufficiently short in duration that the data in the frame are locally stationary.

* * * * *